United States Patent
Okamoto et al.

(10) Patent No.: US 7,585,910 B2
(45) Date of Patent: Sep. 8, 2009

(54) POLYLACTIC ACID COMPOSITION

(75) Inventors: Hirotaka Okamoto, Kariya (JP); Yoshihide Katagiri, Nishikamo-gun (JP); Mitsuru Nakano, Nagoya (JP); Arimitsu Usuki, Nagoya (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 564 days.

(21) Appl. No.: 11/387,964

(22) Filed: Mar. 24, 2006

(65) Prior Publication Data

US 2006/0217476 A1    Sep. 28, 2006

(30) Foreign Application Priority Data

Mar. 25, 2005    (JP) .............................. 2005-088531

(51) Int. Cl.
*B60C 1/00*    (2006.01)
(52) U.S. Cl. ................... 524/287; 524/315; 524/284
(58) Field of Classification Search ................... 524/287
See application file for complete search history.

(56) References Cited

U.S. PATENT DOCUMENTS 6,544,607 B1 *    4/2003    Kuroki et al. ............... 428/35.2

FOREIGN PATENT DOCUMENTS

| JP | 11-35808 | 2/1999 |
|---|---|---|
| JP | 2000-248164 | 9/2000 |
| JP | 3383256 | 12/2002 |
| JP | 2003-12834 | 1/2003 |
| JP | 2003-128900 | 5/2003 |
| JP | 2003-231798 | 8/2003 |
| JP | 2003-313401 | 11/2003 |
| JP | 2004-300389 | 10/2004 |

OTHER PUBLICATIONS

Machine Translation of JP 2003-313401 A.*

* cited by examiner

*Primary Examiner*—David Wu
*Assistant Examiner*—Vu Nguyen
(74) *Attorney, Agent, or Firm*—Oblon, Spivak, McClelland, Maier & Neustadt, P.C.

(57) ABSTRACT

A polylactic acid composition containing polylactic acid and ester-based plasticizer, wherein a content of the ester-based plasticizer is 16 to 33 wt %, and when the composition is highly deformed by stress loading as the relation between the stress and the deformation deviates from linear viscoelastic behavior and thereafter the stress is released, residual deformation measured after the stress is released is not less than 66.0% after 0.2 minute of the stress release, and is not more than 34.0% after 240 hours of the stress release.

18 Claims, 1 Drawing Sheet

Fig. 1

POLYLACTIC ACID COMPOSITION

BACKGROUND OF THE INVENTION

1. Field of the Invention

The present invention relates to a polylactic acid composition, and more particularly relates to a polylactic acid composition suitable for a material of an automobile part such as a bumper.

2. Related Background Art

Polylactic acid has a degradable property by activities of microorganisms or enzymes, so-called biodegradability, and is decomposed to lactic acid, carbon dioxide and water, which are harmless to humans. Thus, polylactic acid has drawn attention as an alternative to a medical material or a general-purpose resin. Moreover, as to a polylactic acid composition containing such polylactic acid, research and development have been conducted to allow the composition to have properties such as drawability and flexibility.

For example, Japanese Unexamined Patent Application Publication No. 2003-313401 (JP 2003-313401 A: Document 1) discloses an aliphatic polyester composition containing aliphatic polyester and an alcohol lignin derivative or a cinnamate ester derivative, which is mixed as a plasticizer in the aliphatic polyester by 10 wt % or less. However, a polylactic acid composition containing an alcohol lignin derivative or a cinnamate ester derivative by 10 wt % or less, that is a type of the aliphatic polyester composition described in Document 1, has not yet been sufficient in terms of drawability.

Moreover, there has been disclosed a polylactic acid composition containing a large amount of ester-based plasticizer in polylactic acid. For example, Japanese Unexamined Patent Application Publication No. 2000-302956 (JP 2000-302956 A: Document 2) discloses an aliphatic polyester composition including 100 part by weight of aliphatic polyester and 10 to 60 parts by weight of at least one compound selected from compounds (B) which are reaction products of 1 to 10 glycerol molecules and carboxylic acid having carbon numbers of 6 to 18. Moreover, Japanese Unexamined Patent Application Publication No. Hei 11 (1999)-35808 (JP 11-35808 A: Document 3) discloses a lactic acid based polymer composition including an ether ester plasticizer of weight-average molecular weight 150 to 30000. Furthermore, Japanese Unexamined Patent Application Publication No.2003-231798 (JP 2003-231798A: Document 4) discloses a lactic acid based resin composition which consists mainly of 67 to 96 Wt % of a lactic acid based resin and 4 to 33 Wt % of a plasticizer of which boiling point is 220° C. or higher under a normal pressure or of which boiling point is 170° C. or higher at 5 to 10 Torr. However, although such polylactic acid compositions described in Documents 2 to 4 show drawability and flexibility, the compositions have not yet been sufficient in terms of a characteristic of retarded elastic recovery. Specifically, the retarded elastic recovery means a behavior of gradual recovering to an approximately original shape without instantaneous drastic deformation recovery, in the case where stress is released after large deformation which deviates from a linear viscoelastic behavior.

SUMMARY OF THE INVENTION

The present invention has been accomplished in view of the foregoing problems of the related art, and an object thereof is to provide a polylactic acid composition capable of having high-level drawability and flexibility which enable large deformation which deviates from a linear viscoelastic behavior when stress is applied, and capable of having an excellent characteristic of retarded elastic recovery of gradual recovering to an approximately original shape without instantaneous drastic deformation recovery, in the case where the stress is released after the large deformation which deviates from the linear viscoelastic behavior.

The present inventors have diligently conducted studies in order to accomplish the foregoing object. As a result, they established that a polylactic acid composition has high-level drawability and flexibility as well as a surprisingly excellent characteristic of retarded elastic recovery by containing 16 to 33 wt % of ester-based plasticizer in polylactic acid. Thus, they perfected the present invention based on this knowledge.

Specifically, the polylactic acid composition of the present invention is a polylactic acid composition containing polylactic acid and ester-based plasticizer, wherein a content of the ester-based plasticizer is 16 to 33 wt %, and when stress is applied to significantly deform the composition compared with a state that deviates from a linear viscoelastic behavior and thereafter the stress is released, residual deformation measured after the stress is released is not less than 66.0% after 0.2 minute of the stress release, and is not more than 34.0% after 240 hours of the stress release.

As the polylactic acid composition of the present invention described above, it is preferable that the residual deformation is 66.0% or more after 0.2 minute of the stress release, and is 34.0% or less after 24 hours of the stress release. Moreover, it is preferable that the residual deformation is 66.0% or more after 0.2 minute of the stress release, and is 34.0% or less after 1 hour of the stress release.

Moreover, it is preferable that the ester-based plasticizer according to the present invention is at least one selected from a group consisting of an alcohol lignin derivative, a cinnamate ester derivative, a citrate ester derivative and a glycerol ester derivative. It is more preferable that the ester-based plasticizer is the cinnamate ester derivative out of those described above.

Furthermore, as the cinnamate ester derivative described above, one expressed by the following general formula (1)

[Formula 1]

(1)

(in the formula, R denotes at least one group selected from a group consisting of a lower alkyl group, an aryl group that may have a substituent group, an aryl-alkyl group that may have a substituent group and an aryl-alkenyl group that may have a substituent group) is preferable.

It is more preferable that the cinnamate ester derivative is benzyl cinnamate expressed by the following structural formula (2)

[Formula 2]

(2)

or cinnamyl cinnamate expressed by the following structural formula (3).

[Formula 3]

(3)

Moreover, as the polylactic acid composition of the present invention described above, it is preferable that the content of the ester-based plasticizer is 16 to 25 wt %.

Furthermore, as the polylactic acid composition of the present invention described above, it is preferable that a weight-average molecular weight of the polylactic acid is 30000 or more.

Note that the residual deformation in the present invention is a value obtained by use of the following measuring method.

Figure 1:
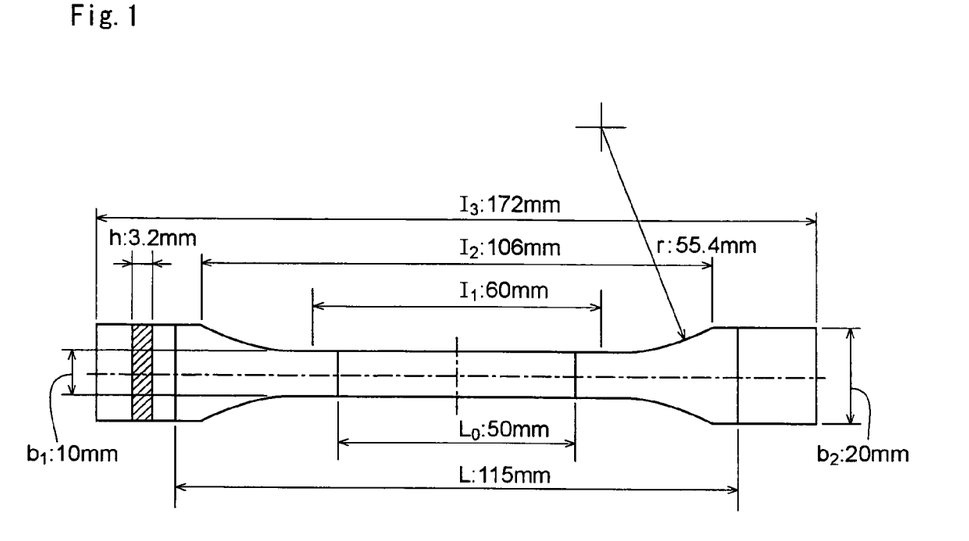
FIG. 1 is a front view of a dumbbell specimen used for measuring residual deformation.

First, description will be given of a specimen used for measuring the residual deformation. FIG. 1 is a front view of a dumbbell-shaped specimen used in a method for measuring the residual deformation. Here, in FIG. 1, $l_3$ denotes an overall length of the specimen, $l_2$ denotes a length between wide parallel portions (wide parts) of the specimen, and $l_1$ denotes a length of a narrow parallel portion (narrow part) of the specimen. Moreover, r denotes a curvature radius of curved sections between the narrow part and the wide parts of the specimen, $b_2$ denotes a width of the wide parts of the specimen, $b_1$ denotes a width of the narrow part of the specimen, h denotes a thickness of the specimen, $L_0$ denotes an inter-standard distance, and L denotes an initial distance between chucks.

The specimen as described above conforms to a No.1 dumbbell-shaped specimen described in JIS K 7113. In the present invention, the specimen used for measuring the residual deformation has the following size.

<Size of Specimen>

$l_3$: 172 mm, $l_2$: 106 mm, $l_1$: 60 mm, r: 55.4 mm, $b_2$: 20 mm, $b_1$: 10 mm, h: 3.2 mm, $L_0$: 50 mm and L: 115 mm. Moreover, such a specimen is prepared by injection molding from a polylactic acid composition. For such injection molding, an injection molding machine (manufactured by Nissei Plastic Industrial Co., Ltd.: PS40E2ASE) is used.

Next, description will be given of the method for measuring the residual deformation by use of the specimen as described above. Note that, as a method for highly deformed specimen which deviates from a linear viscoelastic behavior by applying stress, drawing or bending deformation may be adopted. Thus, as to the method for measuring the residual deformation, description will be given by classifying the method into (i) the case of drawing and (ii) the case of bending deformation.

(i) Method for Measuring Residual Deformation in the Case of Drawing

In order to measure the residual deformation as described above, an Instron universal testing machine (manufactured by Instron Corporation: 4302 universal testing machine) is employed as a device for drawing. In the device, both ends of the specimen are held by an accompanying jig so as to set an inter-chuck distance to 115 mm. Next, by use of the device, the specimen is drawn at a speed of 5 mm/min until the inter-chuck distance is set to 215 mm (a drawn length 100 mm). Thereafter, the drawing device is stopped. Such an operation of drawing conforms to "Testing method for tensile properties of plastics" specified by JIS K 7113. Moreover, a strain $\epsilon_1$ is a value obtained by the following equation (1):

$$\epsilon_1 (\%) = \{(l_t - l_i)/l_i\} \times 100 \qquad (1)$$

(in the equation (1), $l_i$ denotes a length of the specimen before test and $l_t$ denotes a length of the specimen when drawing is stopped)

In this operation, the strain $\epsilon_1$ immediately after drawing is stopped is 58.1%.

Next, the specimen drawn so as to set the strain $\epsilon_1$ provided as described above to be 58.1% is immediately removed from the jig, and stress is released. Moreover, the length of the specimen after 0.2 minute of the stress release is measured. Thereafter, the specimen is left on a desk or the like, and the length of the specimen after a lapse of 240 hours (14400 minutes) is measured. Note that the elapsed time is measured by setting the time when the specimen is removed from the jig (when the stress is released) to 0. Subsequently, by use of a value of the length of the specimen, which is measured as described above, residual strain $X_1$ is obtained by the following equation (2):

$$X_1(\%) = \{[(l_t - l_i) - (l_t - l_n)]/(l_t - l_i)\} \times 100 \qquad (2)$$

(in the equation (2), $l_i$ denotes the length of the specimen before the test, $l_t$ denotes the length of the specimen when drawing is stopped, and $l_n$ denotes the length of the specimen after n minutes of the stress release.)

As described above, the residual strain in the present invention can be measured. Note that the tests as described above are all conducted under conditions of a temperature of 23° C. and a relative humidity of 50%.

(ii) Method for Measuring Residual Deformation in the Case of Bending Deformation In order to measure the residual deformation as described above, an Instron universal testing machine (manufactured by Instron Corporation: 4302 universal testing machine), to which a 3-point bending testing jig such as to set the support span to 50 mm is attached, is employed as a device for bending deformation. The specimen is placed on loading supports (two points) of the device. Moreover, a gage mark is given to a portion of the specimen corresponding to a position of a supporting point of the supports. Next, by use of the device, the specimen is bent and deformed until an loading nose which comes into contact with a center of the specimen is moved by 30 mm at a rate of 5 mm/min (the rate is obtained by dividing a deflection by time). Thereafter, the deformation is stopped. Such an operation of bending deformation conforms to "Plastics—Determination of flexural properties" specified by JIS K 7171. Moreover, the deflection is normally defined as an "distance from a initial planar position (before stress is applied) when an upper surface or a lower surface of the specimen is curved at a center position between the supporting points". However, here, the displacement of the loading nose is large and the gage marks are significantly shifted downward from its initial planar position. Thus, here, the deflection is a distance (unit: mm) between a center position of a horizontal line connecting the gage marks and a position of a concave part (the center position between the supporting points). Therefore, although the deflection amount applied by this operation is 30 mm according to a normal definition, the deflection is set to 16 mm according to the definition here. Furthermore, the strain $\epsilon_2$ is a value obtained by the following equation (3):

$$\epsilon_2(\%) = (6hl_t/L^2) \times 100 \quad (3)$$

(in the equation (3), h denotes a thickness of the specimen, L denotes a support span, and $l_t$ denotes a deflection when the device is stopped (when the stress is released).) In this operation, the strain $\epsilon_2$ immediately after deformation is stopped is 12.3%. As described above, when the deflection is dramatically increased, the gage mark position of the specimen is shifted from the supporting point position of the loading support and moved inward between the supporting points. Thus, the strain defined above is an apparent value. For example, in the case where the thickness of the specimen is set to 3.2 mm and the support span is set to 50 mm, when the deflection gets larger than about 10 mm, the gage mark position is shifted from the supporting point position of the loading support. However, since the strain in the case where the deflection is 10 mm is 7.7%, it can be said that there is sufficiently large bending deformation in order to highly deform the specimen which deviates from the linear viscoelastic behavior.

Next, the specimen bent and deformed until the strain $\epsilon_2$ applied as described above is set to 12.3% is immediately removed from the loading supports, and the stress is released. Moreover, the deflection after 0.2 minute of the stress release is measured. Thereafter, the specimen is left on a desk or the like, and the deflection after a lapse of 240 hours (14400 minutes) is measured. Note that the elapsed time is measured by setting the time when the specimen is removed from the supports as the time when the stress is released (0 minute). Subsequently, by use of a value of the measured deflection, residual strain $X_2$ is obtained by the following equation (4):

$$X_2 = (l_n/l_t) \times 100 \quad (4)$$

(in the equation (4), $l_t$ denotes the deflection when the deformation is stopped (when the stress is released), and $l_n$ denotes the deflection after n minutes of the stress release.)

As described above, the residual strain in the present invention can be measured. Note that the tests as described above are all conducted under conditions of a temperature of 23° C. and a relative humidity of 50%.

Note that it is not necessarily certain the reason why the polylactic acid composition of the present invention achieves high-level drawability and flexibility as well as an excellent retarded elastic recovery. Meanwhile, the inventors of the present invention assume as follows. Specifically, first, regarding the point that the polylactic acid can achieve high-level drawability and flexibility, the inventors of the present invention assume that the reason for the above is because molecular mobility is increased by the ester-based plasticizer to enable microscopic deformation to follow macroscopic deformation by external force.

Next, regarding the point that the polylactic acid composition can achieve the excellent retarded elastic recovery, it is easy to understand the point by imagining a relationship between a spring (elastic body) and a dashpot (viscous body) which often appear as a viscoelastic model and by comparing polylactic acid molecules to the spring and the ester-based plasticizer to the dashpot. Specifically, by allowing the composition to contain 16 to 33 wt % of ester-based plasticizer, viscosity of the polylactic acid composition is increased to enable plastic deformation. Moreover, the high viscosity can make instantaneous drastic deformation and recovery difficult. Meanwhile, elastic recovery force of the polylactic acid molecules gradually and continuously acts for a long period of time. Thus, large deformation and recovery are made possible. Moreover, the inventors of the present invention assume that the reason why such behavior is observed not in a combination of another plasticizer and another resin but in a combination of 16 to 33 wt % of ester-based plasticizer and polylactic acid, is because of appropriate compatibility of the combination thereof and properties of the polylactic acid of which the main chain can take a spiral structure easily and which has a glass transition temperature of around 60° C.

According to the present invention, it is made possible to provide a polylactic acid composition capable of having high-level drawability and flexibility which enable large deformation which deviates from a linear viscoelastic behavior when stress is applied and of having an excellent retarded elastic recovery of recovering to an approximately original shape after a lapse of a long period of time without instantaneous drastic deformation recovery when the stress is released after the large deformation which deviates from the linear viscoelastic behavior.

As described above, the polylactic acid composition of the present invention can be large deformation which deviates from the linear viscoelastic behavior. Thus, damage caused by external force can be prevented. Moreover, if instantaneous drastic deformation recovery occured when the stress is released after the large deformation which deviates from the linear viscoelastic behavior, then objects existing around the composition would be likely to be damaged. Meanwhile, the polylactic acid composition of the present invention acts as if the composition is plastically deformed immediately after the stress is released, and no instantaneous drastic deformation recovery occurs. Thus, the problems as described above can be sufficiently prevented. Furthermore, the polylactic acid composition of the present invention recovers approximately to its original shape as in the case of the elastic body after a lapse of a long period of time. Thus, there is no remaining problem with appearance associated with residual deformation.

DETAILED DESCRIPTION OF THE PREFERRED EMBODIMENTS

Hereinafter, the present invention will be described in detail in line with a preferred embodiment thereof.

First, polylactic acid according to the present invention will be described. The polylactic acid according to the present invention may consist of only one of a monomer unit derived from L-lactic acid and a monomer unit derived from D-lactic acid or may be a copolymer of the both. Moreover, if the polylactic acid is the copolymer of the monomer unit derived from L-lactic acid and the monomer unit derived from D-lactic acid, a content of one of the monomer unit derived from D-lactic acid or the monomer unit derived from L-lactic acid is not particularly restricted. However, from a viewpoint that polymer chains of which crystallization is inhibited by lowering of stereoregularity are entangled in multiple ways with each other to enable further improvement in retarded elastic recovery of the polylactic acid composition, the content thereof is preferably within a range of 2 to 98 mol %, more preferably within a range of 5 to 95 mol %, and even more preferably within a range of 15 to 85 mol %.

Moreover, one obtained by blending a plurality of polylactic acids in an arbitrary proportion may be used, the polylactic acids being different from each other in a ratio of the monomer unit derived from L-lactic acid and the monomer unit derived from D-lactic acid.

Furthermore, in the polylactic acid according to the present invention, other polymerizable monomers such as glycolide and caprolactone, in addition to lactic acid or lactide, may be further polymerized to be a copolymer, within a range that it does not inhibit provision of the retarded elastic recovery to the polylactic acid composition obtained. Moreover, a polymer obtained by polymerization of other polymerizable monomers may be blended with polylactic acid. Note that it is preferable that a proportion of a polymer chain derived from the other polymerizable monomers to the entire polymer is 50 mol % or less in monomer equivalent.

Moreover, the polylactic acid according to the present invention may include a branch and/or a crosslinked structure within the range that does not inhibit provision of the retarded elastic recovery to the polylactic acid composition obtained.

Moreover, a weight-average molecular weight of the polylactic acid according to the present invention is preferably 30000 or more, more preferably 100000 or more, and even more preferably 150000 or more. If the weight-average molecular weight is less than 30000, entanglement of polylactic acid molecular chains is insufficient. Thus, the retarded elastic recovery tends to be lowered.

A method for synthesizing such a polylactic acid is not particularly limited but direct polycondensation of D-lactic acid and L-lactic acid may be adopted. Moreover, ring opening polymerization of D-lactide, L-lactide and meso-lactide, which are cyclic dimmers of lactic acid, may be adopted.

Next, description will be given of ester-based plasticizer according to the present invention. As such ester-based plasticizer, an alcohol lignin derivative, a citrate ester derivative, a glycerol ester derivative, a cinnamate ester derivative, phthalate ester, adipate ester, sebacate, phosphate ester and the like are cited. Among such ester-based plasticizer, from a viewpoint of preparation of a homogeneous complex, it is preferable to use at least one selected from a group consisting of the cinnamate ester derivative, the citrate ester derivative and the glycerol ester derivative.

As such a cinnamate ester derivative, one which is ester of alcohol and cinnamic acid (β-phenyl acrylic acid) naturally existing as a component of cinnamon and the like, and is expressed by the following general formula (1):

[Formula 4]

is preferable.

In the general formula, R is at least one group selected from a group consisting of a lower alkyl group, an aryl group that may have a substituent group, an aryl-alkyl group that may have a substituent group and an aryl-alkenyl group that may have a substituent group. Among those described above, the aryl-alkyl group or the aryl-alkenyl group is preferable.

As the lower alkyl group, alkyl groups having carbon numbers 1 to 5 are cited. Among those described above, a methyl group and an ethyl group are preferable. Moreover, as the aryl group, a phenyl group, a tolyl group, a xylyl group, a biphenyl group, a naphthyl group, an anthoryl group, a phenantolyl group and the like are cited. Among those described above, the phenyl group is preferable. Furthermore, as the aryl-alkyl group, one obtained by substituting the aryl group with the lower alkyl group is cited. Among those described above, a phenylmethyl group is preferable. Moreover, as the aryl-alkenyl group, ones obtained by substituting the aryl group with lower alkenyl groups having carbon numbers of 1 to 5 are cited. Among those described above, a phenylpropenyl group is preferable.

Furthermore, as the substituent group of the aryl group, the aryl-alkyl group and the aryl-alkenyl group, at least one group selected from a group consisting of a lower alkyl group, a lower alkoxy group, an amino group, a nitro group and halogen is cited. Among those described above, the lower alkyl group, the lower alkoxy group and the amino group are preferable. Note that the lower alkyl group described here is the same as that described above. Moreover, as the lower alkoxy group, alkoxy groups having carbon numbers 1 to 5 are cited. Among those described above, a methoxy group and an ethoxy group are preferable. Furthermore, as halogen, chlorine, fluorine, bromine and iodine are cited.

In the general formula described above, X is at least one group selected from a group consisting of a lower alkyl group, a lower alkoxy group, an amino group, a nitro group and halogen. Among those described above, the lower alkyl group, the lower alkoxy group and the amino group are preferable. Note that the lower alkyl group, the lower alkoxy group and halogen described here are all the same as those described above.

Furthermore, n in the general formula is an integer of 0 to 5. Specifically, there may not be a substituent group expressed by X. Moreover, all five hydrogens on a phenyl group may be substituted with a group expressed by X. Note that, if there exists a substituent group expressed by X, all substituent groups may be the same or different. Moreover, the number of the substituent groups is preferably 1 to 2. Furthermore, a position of substitution is preferably a meta position or a para position.

As the cinnamate ester derivative, benzyl cinnamate (cinnamic benzyl) expressed by the following structural formula (2):

[Formula 5]

(2)

or cinnamyl cinnamate (cinnamic cinnamyl) expressed by the following structural formula (3):

[Formula 6]

(3)

is particularly preferable.

Moreover, as the citrate ester derivative, monoalkyl citrate, dialkyl citrate, trialkyl citrate, acetyl monoalkyl citrate, acetyl dialkyl citrate, acetyl trialkyl citrate and the like are cited. Among such citrate derivatives, from a viewpoint of sufficiently preventing bleedout by improving compatibility with the polylactic acid, acetyl alkyl citrate is preferable. Furthermore, it is more preferable to use the alkyl substituent group having a carbon number of 2 or less (for example, acetyl triethyl citrate or the like). When such a carbon number exceeds 2, the citrate derivative bleeds out and it tends to be difficult to form a polylactic acid composition obtained by injection molding and the like.

Furthermore, as the glycerol ester derivative, monoglycerol alkylate, diglycerol alkylate, triglycerol alkylate, tetraglycerol alkylate, monoglycerol arylate, diglycerol arylate, triglycerol arylate, tetraglycerol arylate and the like are cited. Among such glycerol ester derivatives, for example, if a glycerol ester derivative containing an alkyl substituent group (for example, monoglycerol alkylate, diglycerol alkylate, triglycerol alkylate, tetraglycerol alkylate and the like) is used, it is preferable to use a glycerol ester derivative (for example, diglycerol tetra acetate and the like) having a glycerol polymerization degree of 2 to 4 from a viewpoint of sufficiently preventing bleedout by improving compatibility with the polylactic acid. When such a glycerol polymerization degree is outside the range of 2 to 4, the glycerol ester derivative bleeds out and it tends to be difficult to form a polylactic acid composition obtained by injection molding and the like. Moreover, it tends to be difficult to obtain a homogeneous complex.

Furthermore, among such ester-based plasticizer, it is particularly preferable to use the cinnamate ester derivative from a viewpoint that, in the case where the obtained polylactic acid composition is deformed and the stress is released, residual deformation after a lapse of a long period of time is reduced. Note that, as to such ester-based plasticizer, one type thereof may be singularly used or two types or more may be mixed and used.

Moreover, in the polylactic acid composition of the present invention, it is required that the content of the ester-based plasticizer is 16 to 33 wt %. If the content is less than 16 wt %, the polylactic acid composition is broken before the composition is highly deformed compared with the state that deviates from the linear viscoelastic behavior. Even if the polylactic acid composition is not broken, the retarded elastic recovery at which the present invention is aimed cannot be obtained. Meanwhile, if the content exceeds 33 wt %, it is difficult to allow the polylactic acid composition to contain the ester-based plasticizer without bleedout thereof. Furthermore, the retarded elastic recovery of the polylactic acid composition obtained is lowered.

Furthermore, it is preferable that the content of such ester-based plasticizer is about 16 to 25 wt % from a viewpoint of further improving the retarded elastic recovery of the polylactic acid obtained.

Moreover, in the polylactic acid composition of the present invention, as long as the effects of the present invention are not impaired, a crystal nucleator, an inorganic filler, a hydrolytic inhibitor, an antioxidant, a heat resisting agent, a lubricant, a light stabilizer, a UV absorber, an antistatic agent, a flame retardant, a mold remover, a pigment, a coloring agent, a dye, an anti-fungus agent and the like may be added.

Next, description will be given of the polylactic acid composition of the present invention. Specifically, the polylactic acid composition of the present invention is a polylactic acid composition containing the polylactic acid and the ester-based plasticizer. In the polylactic acid composition, a content of the ester-based plasticizer is 16 to 33 wt %. Moreover, when stress is applied to highly deform the composition compared with a state that deviates from a linear viscoelastic behavior and thereafter the stress is released, residual deformation measured after the stress is released is 66.0% or more after 0.2 minute of the stress release, and is 34.0% or less after 240 hours of the stress release.

As described above, the polylactic acid composition of the present invention can be highly deformed by stress loading compared with the state that deviates from the linear viscoelastic behavior. Here, the linear viscoelastic behavior means that the stress is increased in proportion to a strain. In a plastic molded article, the state that deviates from the linear viscoelastic behavior can be almost definitely set if the strain $\epsilon_1$ by drawing described above is not less than 10% or the strain $\epsilon_2$ by bending deformation described above is not less than 2%. The polylactic acid composition of the present invention has high-level drawability and flexibility as described above.

Moreover, the polylactic acid composition of the present invention has a characteristic (retarded elastic recovery) that, when stress is applied to highly deform the composition compared with the state that deviates from the linear viscoelastic behavior and thereafter the stress is released, residual deformation measured after the stress is released is 66.0% or more after 0.2 minute of the stress release, and is 34.0% or less after 240 hours of the stress release. As described above, the polylactic acid composition of the present invention acts as if the composition is plastically deformed in the case where the composition is highly deformed compared with the state that deviates from the linear viscoelastic behavior and thereafter the stress is released. Moreover, no instantaneous drastic deformation recovery occurs. Furthermore, the polylactic acid composition shows the retarded elastic recovery of recovering approximately to its original shape as in the case of the elastic body after a lapse of a long period of time.

If such residual deformation is less than 66.0% after 0.2 minute of the stress release, instantaneous drastic deformation recovery occur after the stress is released. As a result, the retarded elastic recovery at which the present invention is aimed cannot be obtained. Thus, in the case where a molded article is made of a polylactic acid composition having residual deformation of less than 66.0% after 0.2 minute of the stress release, objects existing on and around the article may be damaged by the instantaneous drastic deformation recovery. Moreover, if the residual deformation exceeds 34.0% after 240 hours of the stress release, there will be large problems with appearance caused by the deformation.

Moreover, as the polylactic acid composition of the present invention, from a viewpoint of obtaining a desirable retarded elastic recovery in a practical sense, it is preferable that the residual deformation is 66.0% or more after 0.2 minute of the stress release, and is 34.0% or less after 24 hours of the stress release. Moreover, it is more preferable that the residual deformation is 66.0% or more after 0.2 minute of the stress release, and is 34.0% or less after 1 hour of the stress release. Furthermore, the residual deformation after 0.2 minute of the stress release is preferably 75% or more and more preferably 90% or more.

Note that, when the residual deformation is measured in the present invention, drawing is performed at a drawing speed of 5 mm/min in the case where the deformation mode is drawing. Meanwhile, as the polylactic acid composition of the present invention, from a viewpoint that higher level of drawability and retarded elastic recovery can be achieved, it is preferable that the state where the strain $\epsilon_1$ is 10% or more can be set even when the drawing speed at which the composition is deformed by drawing is 10 to 20 mm/min or more. Moreover, it is preferable that the polylactic acid composition of the present invention is one that can achieve retarded elastic recovery within the values described above.

Moreover, when the residual deformation is measured in the present invention, bending deformation is performed at a deflection speed of 5 mm/min in the case where the deformation mode is bending deformation. Meanwhile, as the polylactic acid composition of the present invention, from a viewpoint that higher level of flexibility and retarded elastic recovery can be achieved, it is preferable that the state where the strain $\epsilon_2$ is 2% or more can be set even when the deflection speed is 10 to 15 mm/min or more.

Furthermore, in the present invention, in the case where the composition is highly deformed by drawing compared with the state that deviates from the linear viscoelastic behavior, the state where the strain $\epsilon_1$ is 10% or more is defined. However, as the polylactic acid composition of the present invention, from a viewpoint of achieving higher level of drawability, a polylactic acid composition which can set the strain $\epsilon_1$ to 25% or more as the large deformation compared with the state that deviates from the linear viscoelastic behavior is preferable. In addition, a polylactic acid composition which can set the strain $\epsilon_1$ to 50% or more is more preferable. Moreover, in the present invention, in the case where the large deformation compared with the state that deviates from the linear viscoelastic behavior is performed by the bending deformation described above, the state where the strain $\epsilon_2$ is 2% or more is defined. However, as the polylactic acid composition of the present invention, from a viewpoint of achieving higher level of flexibility, a polylactic acid composition which can set the strain $\epsilon_2$ to 4% or more is preferable. In addition, a polylactic acid composition which can set the strain $\epsilon_2$ to 6% or more is more preferable.

Next, description will be given of a method for producing a polylactic acid composition of the present invention. The method for producing a polylactic acid composition of the present invention is not particularly limited. It is possible to use any method by which a predetermined amount of the ester-based plasticizer can be evenly mixed in polylactic acid.

As a suitable method for producing such a polylactic acid composition, for example, the following method can be adopted. Specifically, after the polylactic acid and the ester-based plasticizer are dissolved in a solvent and mixed, the solvent is removed by evaporation or the like to produce the polylactic acid composition. Note that, as the solvent, an organic solvent such as chloroform is suitably used.

Moreover, as another suitable method for producing such a polylactic acid composition, the following method can be adopted. Specifically, the polylactic acid and the predetermined amount of ester-based plasticizer are mixed by use of a melt-mixing method to produce the polylactic acid composition. When the polylactic acid composition of the present invention is produced by use of the method as described above, it is preferable that a temperature at which the polylactic acid and the ester-based plasticizer are melt is set to about 160 to 250° C. When the temperature as described above is below the lower limit described above, melting of the polylactic acid composition is insufficient. Thus, it tends to be difficult to evenly disperse the polylactic acid and the ester-based plasticizer. On the other hand, when the temperature exceeds the upper limit described above, a molecular weight of the polylactic acid composition obtained is reduced. Consequently, properties such as drawability and retarded elastic recovery tend to be impaired. Moreover, retention time at the melting temperature described above is not particularly limited but is preferably about 0.1 to 30 minutes. When such retention time is less than the lower limit described above, sufficient fluidity cannot be obtained. Thus, mixing processability tends to be lowered or it tends to be difficult for the polylactic acid and the ester-based plasticizer to be evenly dispersed. On the other hand, when the retention time exceeds the upper limit described above, the molecular weight of the polylactic acid composition obtained is reduced. Consequently, the properties such as the drawability and the retarded elastic recovery tend to be impaired. As described above, the polylactic acid composition of the present invention can be produced by mixing the polylactic acid and the predetermined amount of ester-based plasticizer after melting the both, and cooling the mixture.

The polylactic acid composition of the present invention obtained as described above can be utilized as various molded products. A method for molding such a molded product is not particularly limited but injection molding, extrusion molding, blow molding, inflation molding, profile extrusion molding, injection blow molding, vacuum pressure molding, spinning and the like can be suitably used. Moreover, a shape, a thickness and the like of the molded product are not particularly limited. For example, the molded product may have a shape of any of an injection molded product, an extrusion molded product, a compression molded product, a blow molded product, a sheet, a film, a string, a fabric and the like. As such a molded product, specifically, cited are automobile parts including: exterior parts such as a bumper, a fender, a door panel, a mud guard, a pillar garnish, a spoiler and a side molding; and interior parts such as an instrument panel, a meter panel, a door trim, a console box and a cup holder. Moreover, in the case where such a molded product is used as a sheet, the molded product may have paper or another polymer sheet laminated thereon and used as a laminated product having a multilayer structure.

EXAMPLES

Based on examples and comparative examples, more concrete description of the present invention will be given below.

However, the present invention is not limited to the following examples. Note that, as to polylactic acid compositions obtained in the respective examples and comparative examples, measurement of residual deformation is performed as described below. Moreover, in such measurement of residual deformation, a drawing test or a bending test is conducted in order to highly deform the composition compared with a state that deviates from a linear viscoelastic behavior. The following description is classified into the case of the drawing test and the case of the bending deformation test.

<Drawing Test>

Example 1

First, polylactic acid (Lacty#9030 produced by Shimazu Co., Ltd.) and 16.7 wt % of benzyl cinnamate (produced by Tokyo Chemical Industry Co., Ltd.) are melt-mixed by use of a twin screw extruder (TEX 30α manufactured by The Japan Steel Works, Ltd.) to produce a polylactic acid composition. From this composition, a specimen shown in FIG. 1 in which the polylactic acid is in an amorphous state is prepared by use of an injection molding machine (PS40E2ASE manufactured by Nissei Plastic Industrial Co., Ltd.). Such a specimen shown in FIG. 1 conforms to a No.1 dumbbell-shaped specimen described in JIS K 7113, and a size thereof is as follows. Note that the reference numerals in FIG. 1 are the same as those described above.

<Size of Specimen>

$l_3$: 172 mm, $l_2$: 106 mm, $l_1$: 60 mm, r: 55.4 mm, $b_2$: 20 mm, $b_1$: 10 mm, h: 3.2 mm, $L_0$: 50 mm and L: 115 mm.

Next, the specimen obtained as described above is left under conditions of a temperature of 23° C. and a relative humidity of 50% for 48 hours or more. Thereafter, the specimen is set in an Instron universal testing machine so as to set an inter-chuck distance to 115 mm. Subsequently, a drawing test is performed by drawing the specimen at a speed of 5 mm/min until the inter-chuck distance is set to 215 mm (drawn length: 100 mm and applied strain $\epsilon_1$: 58.1%). Thereafter, the specimen is removed from the chuck and stress is released. Accordingly, lengths of the respective specimens after 0.2 minute, 1 hour, 24 hours and 240 hours of the stress release are measured. Subsequently, residual deformation $X_1$ of each of the specimens after 0.2 minute, 1 hour, 24 hours and 240 hours of the stress release is obtained by use of the equation (2). Table 1 shows the results obtained.

Example 2

A drawing test is conducted as in the case of Example 1 except that a drawing speed is set to 20 mm/min. Thus, the residual deformation $X_1$ is obtained. Table 1 shows the results obtained.

Example 3

A drawing test is conducted as in the case of Example 1 except that an amount of benzyl cinnamate added is set to 20 wt %. Thus, the residual deformation $X_1$ is obtained. Table 1 shows the results obtained.

Example 4

A drawing test is conducted as in the case of Example 1 except that the amount of benzyl cinnamate added is set to 20 wt % and the drawing speed is set to 20 mm/min. Thus, the residual deformation $X_1$ is obtained. Table 1 shows the results obtained.

Example 5

A drawing test is conducted as in the case of Example 1 except that the amount of benzyl cinnamate added is set to 30 wt %. Thus, the residual deformation $X_1$ is obtained. Table 1 shows the results obtained. Note that, in the specimen obtained, the polylactic acid is partially crystallized to become clouded after molding before the test is started.

Example 6

A drawing test is conducted as in the case of Example 1 except that the amount of benzyl cinnamate added is set to 30 wt % and the drawing speed is set to 20 mm/min. Thus, the residual deformation $X_1$ is obtained. Table 1 shows the results obtained.

Example 7

A drawing test is conducted as in the case of Example 1 except that cinnamyl cinnamate is used instead of benzyl cinnamate and an amount of cinnamyl cinnamate added is set to 20 wt %. Thus, the residual deformation $X_1$ is obtained. Table 1 shows the results obtained.

Example 8

A drawing test is conducted as in the case of Example 1 except that cinnamyl cinnamate is used instead of benzyl cinnamate, the amount of cinnamyl cinnamate added is set to 20 wt % and the drawing speed is set to 20 mm/min. Thus, the residual deformation $X_1$ is obtained. Table 1 shows the results obtained.

Example 9

A drawing test is conducted as in the case of Example 1 except that acetyl triethyl citrate (Citroflex A-2 produced by Morimura Bros., Inc.) is used instead of benzyl cinnamate. Thus, the residual deformation $X_1$ is obtained. Table 1 shows the results obtained.

Example 10

A drawing test is conducted as in the case of Example 1 except that diglycerol tetra acetate (Rikemal PL710 produced by Riken Vitamin Co., Ltd.) is used instead of benzyl cinnamate. Thus, the residual deformation $X_1$ is obtained. Table 1 shows the results obtained.

Comparative Example 1

A drawing test is conducted as in the case of Example 1 except that the amount of benzyl cinnamate added is set to 10 wt %. However, since the specimen is broken before the inter-chuck distance is reaches 215 mm, the residual deformation cannot be measured.

Comparative Example 2

A drawing test is conducted as in the case of Example 1 except that the amount of benzyl cinnamate added is set to 15 wt %. Thus, the residual deformation $X_1$ is obtained. Table 1 shows the results obtained.

Comparative Example 3

A drawing test is conducted as in the case of Example 1 except that the amount of benzyl cinnamate added is set to 15 wt % and the drawing speed is set to 20 mm/min. However, since the specimen is broken before the inter-chuck distance reaches to 215 mm, the residual deformation cannot be measured.

Comparative Example 4

A drawing test is conducted as in the case of Example 1 except that the amount of benzyl cinnamate added is set to 35 wt %. Table 1 shows the results obtained.

Comparative Example 5

A drawing test is conducted as in the case of Example 1 except that oleic amide (ALFLOW E-10 produced by NOF Corporation) is used instead of benzyl cinnamate and an amount of oleic amide added is set to 20 wt %. However, since the specimen is broken before the inter-chuck distance reaches to 215 mm, the residual deformation cannot be measured.

Comparative Example 6

A drawing test is conducted as in the case of Example 1 except that ethylene-bis-stearamide (ALFLOW H-50S produced by NOF Corporation) is used instead of benzyl cinnamate and an amount of ethylene-bis-stearamide added is set to 20 wt %. However, since the specimen is broken before the inter-chuck distance reaches to 215 mm, the residual deformation cannot be measured.

Comparative Example 7

A drawing test is conducted as in the case of Example 1 except that calcium stearate (calcium stearate produced by NOF Corporation) is used instead of benzyl cinnamate and an amount of calcium stearate added is set to 20 wt %. However, since the specimen is broken before the inter-chuck distance reaches to 215 mm, the residual deformation cannot be measured.

Comparative Example 8

A drawing test is conducted as in the case of Example 1 except that high density polyethylene wax (LICOWAX PE520 produced by Clariant in Japan) is used instead of benzyl cinnamate and an amount of high density polyethylene wax added is set to 20 wt %. However, since the specimen is broken before the inter-chuck distance reaches to 215 mm, the residual deformation cannot be measured.

Comparative Example 9

A drawing test is conducted as in the case of Example 1 except that ethylene-bis-hydroxystearamide (WX-1 produced by Kawaken Fine Chemicals Co., Ltd.) is used instead of benzyl cinnamate and an amount of ethylene-bis-hydroxystearamide added is set to 20 wt %. However, since the specimen is broken before the inter-chuck distance reaches to 215 mm, the residual deformation cannot be measured.

<Bending Test>

Example 11

A specimen is prepared as in the case of Example 1 except that the of benzyl cinnamate added is set to 20 wt %. Around a center of the specimen obtained as described above, two gage marks are provided with a space of 50 mm therebetween. Next, the specimen is placed on loading supports of an Instron universal testing machine having a three-point bending test jig attached thereto, in which support span is set to 50 mm. Specifically, the specimen is placed on the loading supports so as to position the gage marks on the supporting points. Thereafter, a bending deformation test is performed by bending and deforming the specimen until loading nose reaches 30 mm (applied strain $\epsilon_2$: 12.3%) at a speed of 5 mm/min. Subsequently, the specimen is removed from the loading supports and stress is released. Accordingly, deflection of the respective specimens after 0.2 minute, 1 hour, 24 hours and 240 hours of the stress release are measured. Thereafter, residual deformation $X_1$ of each of the specimens after 0.2 minute, 1 hour, 24 hours and 240 hours of the stress release is obtained. Table 2 shows the results obtained.

Example 12

A bending test is conducted as in the case of Example 11 except that the speed is set to 20 mm/min. Thus, the residual deformation $X_1$ is obtained. Table 2 shows the results obtained.

Example 13

A bending test is conducted as in the case of Example 11 except that cinnamyl cinnamate is used instead of benzyl cinnamate. Thus, the residual deformation $X_1$ is obtained. Table 2 shows the results obtained.

Example 14

A bending test is conducted as in the case of Example 11 except that cinnamyl cinnamate is used instead of benzyl cinnamate and the deflection speed is set to 20 mm/min. Thus, the residual deformation $X_1$ is obtained. Table 2 shows the results obtained.

TABLE 1

| | Example 1 | Example 2 | Example 3 | Example 4 | Example 5 | Example 6 | Example 7 | Example 8 | Example 9 | Example 10 | Comparative Example 2 | Comparative Example 4 |
|---|---|---|---|---|---|---|---|---|---|---|---|---|
| PLASTICIZER | benzyl cinnamate | benzyl cinnamate | benzyl cinnamate | benzyl cinnamate | benzyl cinnamate | benzyl cinnamate | cinnamyl cinnamate | cinnamyl cinnamate | acetyl triethyl citrate | diglycerol tetra acetate | benzyl cinnamate | benzyl cinnamate |
| AMOUNT OF ADDITION (wt %) | 16.7 | 16.7 | 20.0 | 20.0 | 30.0 | 30.0 | 20.0 | 20.0 | 16.7 | 16.7 | 15.0 | 35.0 |
| DRAWING SPEED (mm/min) | 5.0 | 20.0 | 5.0 | 20.0 | 5.0 | 20.0 | 5.0 | 20.0 | 5.0 | 5.0 | 5.0 | 5.0 |

TABLE 1-continued

|  | Example 1 | Example 2 | Example 3 | Example 4 | Example 5 | Example 6 | Example 7 | Example 8 | Example 9 | Example 10 | Comparative Example 2 | Comparative Example 4 |
|---|---|---|---|---|---|---|---|---|---|---|---|---|
| LENGTH OF SPECIMEN BEFORE TEST $I_i$ (mm) | 172.0 | 172.0 | 172.0 | 172.0 | 172.0 | 172.0 | 172.0 | 172.0 | 172.0 | 172.0 | 172.0 | 172.0 |
| LENGTH OF SPECIMEN WHEN DRAWING IS STOPPED $I_t$ (mm) | 272.0 | 272.0 | 272.0 | 272.0 | 272.0 | 272.0 | 272.0 | 272.0 | 272.0 | 272.0 | 272.0 | 272.0 |
| LENGTH OF SPECIMEN AFTER 0.2 MINUTE OF STRESS RELEASE $I_{0.2}$ (mm) | 266.0 | 267.0 | 267.0 | 262.5 | 245.0 | 240.0 | 267.0 | 262.0 | 238.0 | 239.0 | 269.0 | 220.0 |
| LENGTH OF SPECIMEN AFTER 1 HOUR OF STRESS RELEASE $I_{60}$ (mm) | 243.8 | 246.5 | 175.2 | 178.5 | 197.8 | 195.0 | 194.0 | 197.7 | 212.5 | 217.0 | 257.0 | 210.0 |
| LENGTH OF SPECIMEN AFTER 24 HOURS OF STRESS RELEASE $I_{1440}$ (mm) | 210.3 | 219.8 | 172.0 | 173.0 | 195.0 | 193.0 | 173.0 | 176.6 | 207.0 | 211.3 | 247.0 | 208.0 |
| LENGTH OF SPECIMEN AFTER 240 HOURS OF STRESS RELEASE $I_{14400}$ (mm) | 198.0 | 204.5 | 172.0 | 173.0 | 193.0 | 191.0 | 172.0 | 176.2 | 204.0 | 205.0 | 231.0 | 205.0 |
| APPLIED DISTORTION (%) | 58.1 | 58.1 | 58.1 | 58.1 | 58.1 | 58.1 | 58.1 | 58.1 | 58.1 | 58.1 | 58.1 | 58.1 |
| RESIDUAL DEFORMATION AFTER 0.2 MINUTE (%) | 94.0 | 95.0 | 95.0 | 90.5 | 73.0 | 68.0 | 95.0 | 90.0 | 66.0 | 67.0 | 97.0 | 48.0 |
| RESIDUAL DEFORMATION AFTER 1 HOUR (%) | 71.8 | 74.5 | 3.2 | 6.5 | 25.8 | 23.0 | 22.0 | 25.7 | 40.5 | 45.0 | 85.0 | 38.0 |
| RESIDUAL DEFORMATION AFTER 24 HOURS (%) | 38.3 | 47.8 | 0.0 | 1.0 | 23.0 | 21.0 | 1.0 | 4.6 | 35.0 | 39.3 | 75.0 | 36.0 |
| RESIDUAL DEFORMATION AFTER 240 HOURS (%) | 26.0 | 32.5 | 0.0 | 1.0 | 21.0 | 19.0 | 0.0 | 4.2 | 32.0 | 33.0 | 59.0 | 33.0 |

TABLE 2

|  | Example 11 | Example 12 | Example 13 | Example 14 |
|---|---|---|---|---|
| PLASTICIZER | benzyl cinnamate | benzyl cinnamate | cinnamyl cinnamate | cinnamyl cinnamate |
| AMOUNT OF ADDITION (wt %) | 20 | 20 | 20 | 20 |
| DEFLECTION SPEED (mm/min) | 5 | 20 | 5 | 20 |
| THICKNESS OF SPECIMEN h (mm) | 3.2 | 3.2 | 3.2 | 3.2 |
| SUPPORT SPAN L (mm) | 50 | 50 | 50 | 50 |
| DEFLECTION AMOUNT WHEN DEVICE IS STOPPED (WHEN STRESS IS RELEASED) $I_t$ (mm) | 16 | 16 | 16 | 16 |
| DEFLECTION AMOUNT AFTER 0.2 MINUTE OF STRESS RELEASE $I_{0.2}$ (mm) | 15 | 16 | 16 | 16 |
| DEFLECTION AMOUNT AFTER 1 HOUR OF STRESS RELEASE $I_{60}$ (mm) | 0.8 | 0.4 | 6.4 | 4.5 |

TABLE 2-continued

|  | Example 11 | Example 12 | Example 13 | Example 14 |
|---|---|---|---|---|
| DEFLECTION AMOUNT AFTER 240 HOURS OF STRESS RELEASE $I_{1440}$ (mm) | 0 | 0.2 | 0 | 0.1 |
| APPLIED DISTORTION (%) | 12.3 | 12.3 | 12.3 | 12.3 |
| RESIDUAL DEFORMATION AFTER 0.2 MINUTE (%) | 93.8 | 100 | 100 | 100 |
| RESIDUAL DEFORMATION AFTER 1 HOUR (%) | 5 | 2.5 | 40 | 28.1 |
| RESIDUAL DEFORMATION AFTER 24 HOURS (%) | 0 | 1.3 | 0 | 0.6 |

As is clear from the results shown in Tables 1 and 2, the polylactic acid composition of the present invention obtained in each of Examples 1 to 14 shows excellent drawability and flexibility. Moreover, the polylactic acid composition meets the conditions that the residual deformation is 66.0% or more after 0.2 minute of the stress release, and is 34.0% or less after 240 hours of the stress release. Thus, it is confirmed that the polylactic acid composition shows an excellent retarded elastic recovery.

Moreover, as is clear from the results shown in Table 1, in the polylactic acid composition of the present invention obtained in each of Examples 1 to 10, the specimen is never broken even if drawing is performed until the distortion reaches to 58.1%. Thus, it is confirmed that the polylactic acid composition shows excellent drawability. Moreover, as is clear from the results shown in Table 2, in the polylactic acid composition of the present invention obtained in each of Examples 11 to 14, the specimen is never broken even if bending deformation is applied until the distortion reaches to 12.3%. Thus, it is confirmed that the polylactic acid composition shows high-level flexibility.

Furthermore, as is clear from the results shown in Tables 1 and 2, in the polylactic acid composition obtained in each of Examples 3, 4, 7, 8 and 11 to 14, which contains 20 wt % of ester-based plasticizer, the residual deformation after 0.2 minute of the stress release is 90% or more. Thus, it is confirmed that there is no elastic recovery, and deformation recovery immediately after the stress is released are more gradual. Moreover, in the polylactic acid composition obtained in each of Examples 3, 4 and 11, which contains 20 wt % of benzyl cinnamate, the residual deformation after 1 hour of the stress release is 7% or less. Futhermore, the specimen recovers approximately to its original length after 24 hours have passed since the stress was released. Thus, it is confirmed that the polylactic acid composition shows a higher level retarded elastic recovery.

Moreover, as is clear from the results shown in Table 1, in the polylactic acid composition of the present invention obtained in each of Examples 5 and 6, which contains 30 wt % of ester-based plasticizer, the state of the specimen approaches a rubbery state and the specimen shows a slight elastic recovery immediately after the stress is released. However, the residual deformation after 0.2 minute of the stress release is 66.0% or more. Thus, it is confirmed that little instantaneous drastic deformation recovery occurs. On the other hand, in the polylactic acid composition obtained in Comparative Example 4, which contains 35 wt % of ester-based plasticizer, the specimen shows a strong elastic recovery and the residual deformation after 0.2 minute of the stress release which is 66.0% or less. Thus, it is confirmed that instantaneous drastic deformation recovery occur.

Moreover, in the polylactic acid composition obtained in each of Comparative Examples 1 to 3, which contains less than 16 wt % of ester-based plasticizer, it is confirmed that drawability is lowered or a recovery speed is lowered. For example, in the polylactic acid composition obtained in Comparative Example 2, the residual deformation after a lapse of 240 hours is 59%. Moreover, in the polylactic acid composition obtained in Comparative Example 1, the specimen is broken in drawing, and it is confirmed that the specimen has low drawability. Furthermore, in the polylactic acid composition obtained in Comparative Example 3, which is the same as the polylactic acid composition obtained in Comparative Example 2, the specimen is broken in drawing when the drawing speed is set to 20 mm/min. Thus, it is confirmed that drawability is not sufficient when the content of ester-based plasticizer is less than 16 wt %.

Furthermore, in Comparative Examples 5 to 9 in which plasticizers other than the ester-based plasticizer are used, compatibility between the plasticizers and the polylactic acid is low and the specimens are broken in drawing. Thus, it is confirmed that drawability is not sufficient.

As described above, according to the present invention, it is possible to provide a polylactic acid composition capable of having high-level drawability and flexibility which enable large deformation which deviates from a linear viscoelastic behavior when stress is applied, and of having an excellent retarded elastic recovery of recovering to an approximately original shape after a lapse of a long period of time without instantaneously drastic deformation recovery in the case where the stress is released after the large deformation which deviates from the linear viscoelastic behavior.

Therefore, the polylactic acid composition of the present invention has an excellent retarded elastic recovery and absorbs energy but does not release the energy immediately. Thus, the polylactic acid composition does not damage an object that crashes therewith. Moreover, since the structure gradually returns to its original shape, problems with appearance of a structure itself can be sufficiently resolved. Thus, the polylactic acid composition is particularly useful as a material of a structure such as a bumper, for example.

What is claimed is:

1. A polylactic acid composition containing polylactic acid and ester-based plasticizer, wherein
   the ester-based plasticizer is a cinnamate ester derivative,
   a content of the ester-based plasticizer is 16 to 33 wt %, and
   when the composition was highly deformed by stress loading as the relation between the stress and the deformation deviates from a linear viscoelastic behavior and thereafter the stress is released, residual deformation measured after the stress is released is not less than 66.0% after 0.2 minute of the stress release, and is not more than 34.0% after 240 hours of the stress release.

2. The polylactic acid composition according to claim 1, wherein the residual deformation is not less than 66.0% after 0.2 minute of the stress release, and is not more than 34.0% after 24 hours of the stress release.

3. The polylactic acid composition according to claim 1, wherein the residual deformation is not less than 66.0% after 0.2 minute of the stress release, and is not more than 34.0% after 1 hour of the stress release.

4. The polylactic acid composition according to claim 1, wherein the ester-based plasticizer is represented by formula (1):

[Formula 1]

(1)

wherein

R represents a group selected from a group consisting of a lower alkyl group, an aryl group that may have a substituent group, an aryl-alkyl group that may have a substituent group and an aryl-alkenyl group that may have a substituent group;

X is a lower alkyl group, a lower alkoxy group, an amino group, a nitro group or a halogen; and n is an integer from 0 to 5.

5. The polylactic acid composition according to claim 1, wherein the ester-based plasticizer is a benzyl cinnamate represented by formula (2):

[Formula 2]

(2)

or a cinnamyl cinnamate represented by formula (3):

[Formula 3]

(3)

6. The polylactic acid composition according to claim 1, wherein the content of the ester-based plasticizer is 16 to 25 wt %.

7. The polylactic acid composition according to claim 1, wherein a weight-average molecular weight of the polylactic acid is not less than 30000.

8. The polylactic acid composition according to claim 1, wherein the residual deformation is not less than 66.0% after 0.2 minute of the stress release, and is not more than 34.0% after 1 hour of the stress release.

9. The polylactic acid composition according to claim 4, wherein R represents an aryl group that may have a substituent group.

10. The polylactic acid composition according to claim 9, wherein n is 0.

11. The polylactic acid composition according to claim 9, wherein n is 1.

12. The polylactic acid composition according to claim 9, wherein n is 2.

13. The polylactic acid composition according to claim 9, wherein the residual deformation is 75% after 0.2 minute of the stress release.

14. The polylactic acid composition according to claim 9, wherein R represents an unsubstituted aryl group.

15. The polylactic acid composition according to claim 1, wherein the residual deformation is 75% after 0.2 minute of the stress release.

16. The polylactic acid composition according to claim 1, wherein the residual deformation is 90% after 0.2 minute of the stress release.

17. A method of making a molded product, comprising molding the composition according to claim 1.

18. A method of making the composition of claim 1, comprising combining the polylactic acid and the ester-based plasticizer.

\* \* \* \* \*